United States Patent

Rau

[11] Patent Number: 5,942,135
[45] Date of Patent: Aug. 24, 1999

[54] PROCESS FOR WELDING A SINTERED FRICTION-LINED FOIL

[75] Inventor: Günter Rau, Weissensee/Brand, Germany

[73] Assignee: Sinterstahl GmbH, Fussen, Germany

[21] Appl. No.: 08/996,664

[22] Filed: Sep. 12, 1997

Related U.S. Application Data

[63] Continuation of application No. 08/799,201, Feb. 13, 1997, abandoned.

[30] Foreign Application Priority Data

Feb. 23, 1996 [DE] Germany ............................ 196 06 731

[51] Int. Cl.$^6$ ...................................................... B23K 11/11
[52] U.S. Cl. ................... 219/117.1; 219/118; 219/121.64
[58] Field of Search ................................ 219/117.1, 118, 219/119, 120, 121.12, 121.13, 121.14, 121.36, 121.45, 121.59, 121.63, 121.64, 81, 92, 109, 110

[56] References Cited

U.S. PATENT DOCUMENTS

| | | | |
|---|---|---|---|
| 4,195,279 | 3/1980 | Lemcoe et al. | 338/2 |
| 4,497,994 | 2/1985 | Flemm et al. | 219/109 |
| 4,647,749 | 3/1987 | Koshy | 219/76.14 |
| 4,829,152 | 5/1989 | Rostoker et al. | 219/78.02 |
| 4,911,209 | 3/1990 | Smith et al. | 140/112 |
| 5,143,192 | 9/1992 | Vojacek et al. | |
| 5,229,566 | 7/1993 | Alexandres | 219/86.1 |
| 5,407,119 | 4/1995 | Churchill et al. | 228/124.5 |
| 5,552,573 | 9/1996 | Okita et al. | 219/118 |
| 5,611,944 | 3/1997 | Gilkinson et al. | 219/117.1 |

FOREIGN PATENT DOCUMENTS

15 65 916  6/1970  Germany .
36 09 879 C2  10/1987  Germany .

OTHER PUBLICATIONS

Stanley, Wallace A., "Resistance Welding Designing, Tooling, and Applications", *McGraw–Hill Book Company, Inc.*, 1950, pp. 206–213.

Früngel, Von F. et al. "Feintechnische Schweissverfahren mit kurzzeitiger Energie", *Bull. ASE* 64, vol. 16, 1973, pp. 962–968.

Paton, E.O., "Moderne Kondensatorimpulsschweiss–maschinen für Mikroschweissverbindungen[1]", *Schweisstechnik, Berlin* 35, vol. 9, 1985, pp. 417–419.

Schweinsberg, F., Buckelschweien im Blechdickenbereich unter 1 mm, *Schweitechnik, Berlin* 35, vol. 10, 1985, pp. 440–442.

*Primary Examiner*—Adolf Deneke Berhane
*Attorney, Agent, or Firm*—Morgan & Finnegan, LLP

[57] ABSTRACT

A process for welding sintered, friction-lined foils to each other or to a metallic basic body. Such foils, by definition, have a highly inhomogeneous material structure and are, therefore, poorly weldable by conventional joining methods with the usual process parameters. This applies in particular if the weld has to extend through the foils, for example in resistance spot welding, but the surface of the foil material has to remain largely unaffected in terms of its material properties. The invention describes a process which satisfies the strict requirements both with respect to strength of the welded joint and the material properties. Structural components preferably manufactured according to the process are parts of synchronizing systems in motor vehicle gearboxes.

15 Claims, No Drawings

PROCESS FOR WELDING A SINTERED FRICTION-LINED FOIL

This is a continuation of application Ser. No. 08/799,201, filed on Feb. 13, 1997 now abandoned.

BACKGROUND OF THE INVENTION

1. Field of the Invention

The invention relates to a process for joining a structural component comprising a metallic basic body having a truncated cone-shaped annular surface and a sprinkled-on, sintered friction-lined foil, to be applied to the surface by means of electric spot welding. The sprinkled-on and sintered friction-lined foil preferably has a total thickness of from 0.4 to 2.5 mm and comprises a ductile, metallic carrier sheet and a porous metal/non-metal lining (coating) produced by sprinkling metal powder and sintering the same together and simultaneously onto the carrier sheet in a sintering process.

2. Description of the Related Art

Such structural components are advantageously used at the present time in synchronizing systems of motor vehicle gearboxes. Metallic, sintered molded parts are successfully used as basic bodies.

Such a structural part is described, for example in DE C1 34 17 813. The patent specification refers to the material-locked joining of the basic body and the sprinkled-on and sintered friction-lined foil and cites to spot welding as the preferred joining process. Furthermore, it describes the folding or stamping of the foil prior to its incorporation into and the joining with the basic body in such a way that the basic body and the foil are joined with each other in individual surface zones only, for example within the area of individual foil stretches.

Sprinkled-on and sintered friction-lined foils are always manufactured in the horizontal position in the form of flat foils by applying a sprinkled-on and sintered friction lining to a carrier sheet metal, such sheet metal normally being a low-alloy steel sheet, and are predominantly used also in the form of a flat lamina, in particular in the form of a friction lamina in clutches and transmissions.

Accordingly, the use of sprinkled-on and sintered friction lined foils in oil-lubricated synchronization systems for motor vehicle gearboxes as described above represents, comparatively speaking, a small field of application.

Among the standardized spot welding methods, electric resistance/press welding including spot or projection welding is widely used. By definition, a precondition for the welding process is a material exchange between the parts to be joined in the welding zone, with application of heat and/or force, with addition of a welding material or a welding additive, if need be.

It has been stated, for example in the afore-mentioned patent specification, that with respect to the overall driving behavior of sprinkled-on and sintered friction-lined foils used in structural synchronizing components of motor vehicle gearboxes, any reasonably acceptable measure has to be implemented to make the friction surface—which, in the synchronization process, engages a friction counter-surface and which is the actually active part—as large as possible. The friction work per unit of area of a friction lining must not exceed a maximum value or will wear out rapidly. On the other hand, transmission gears and their structural operating parts have been continuously miniaturized in past years, so that conditioned by such designs, the available friction area has been reduced in spite of the fact that a higher driving capacity is required in the shifting process. Because transmission parts operate in an oil bath, incorporating oil drainage grooves in the friction lining for displacing the oil in the course of friction grip is largely indispensable in connection with synchronizing systems. The grooved areas are lost to the theoretical total friction area as frictionally active, "bearing" friction area. The consequence thereof was that even though many standardized welding methods and particularly also the spot welding process have been tested for the afore-mentioned application, these methods were ultimately ruled out as unsuitable for mass production.

The usual conducive resistance spot welding of sprinkled-on and sintered friction-lined foil materials resulted in inadequate mechanical adhesion to the basic body. The sprinkled-on and sintered friction lining tends to form welding beads which interfere with the friction. Spot welding of such material composites requires comparatively large electrode diameters. The usual resistance spot welding within the zone of small naps or projections incorporated in the foil leads to melting of the foil without resulting in a strong welding joint. The active friction surface of the lining remaining available next to the areas of the joint is noticeably reduced. If, on the other hand, high welding energies are applied in the process and sufficiently large melting zones are produced in this way for good adhesion of the foil, the result is unacceptable especially for structural synchronization components because the remaining loadable friction area is too small, on the one hand, and on the other hand also due to distortion of the foil, resulting in deviation from the dimensional tolerances required for the friction surface.

Heretofore, only the incorporation of the sprinkled-on and sintered friction-lined foil in the basic body by means of laser spot welding has been found in practice to be sufficiently effective. With these designs, however, the welding spots or the welding seams are not located within the active friction area, but in a marginal zone of the foil (i.e., in a laterally folded-on collar).

However, dispensing with fusion of the parts within the zone of the active friction lining gives rise to the risk that the sprinkled-on and sintered friction-lined foil and the basic body become displaced against each other or distorted under the high frictional load, thereby impairing the frictional effect. In spite of careful control of the welding process parameters, it is not completely possible in connection with this process to avoid cold and hot as well as shrinkage fissures within the zone of the welding joint. Furthermore, unsatisfactory formation of pores, and thus a reduction in the strength of the welding joint, is frequently caused in the basic body and on the surface of the parts by organic solvents, nitrides, oxides and/or sulfides.

A serious drawback of all different types of joining connections tested heretofore, including laser welding within the zone of the collar, was found to be that none of the tested standard welding methods satisfied the safety requirements normally to be met in the manufacture of automobiles; in the present case, the safety reserves in connection with the mechanical shear-off strength of the joining bonds measured against the forces of shear possibly occurring on the foils in the friction grip. The risk of detachment of the foil from the basic body at the technically realizable friction limit load has been insufficiently high heretofore. The problem was aggravated when, as is usually the case, surface-nitrated, application-hardened basic bodies made of iron-based materials were used, with organic surface films adhering to such basic bodies.

In light of the above-mentioned problems and drawbacks connected with the joining of a sprinkled-on and sintered friction-lined foil with a basic body, it does not come as a surprise that a great number of tests have been carried out for the purpose of entirely dispensing with the welded incorporation of such foils in structural components of synchronizing systems for motor vehicle shift gearings, and for instead applying and sintering the desired friction lining on the friction surfaces directly onto the truncated cone-like surface of the basic body. However, none of these tests have been successful. To this day, it is not feasible in whole or even by approximation to apply sprinkled-on and sintered friction linings to curved surfaces with the quality taken for granted in the usual manufacture of sprinkled-on and sintered friction-lined foil (i.e., when sprinkling the friction lining onto a flat carrier foil and sintering it in the horizontal position).

Among the structural parts of the type specified above, the so-called double cone plays a special role. This is a structural component made of comparatively thick, dimensionally stable carrier sheet metal, as compared to foils for the afore-mentioned application. The carrier sheet metal is, in the flat condition, first coated with a sprinkled-on friction lining and the coating is then sintered before the process of coating with a sprinkled-on lining and sintering is repeated on the other side of the sheet metal substrate. According to DE C1 36 09 879, the flat foil so produced is next shaped by deep-drawing into a cone as normally used for such friction surfaces. Such a friction ring is incorporated in the gearing as a floating structural part between the friction pair of two axially movable friction counter-surfaces. The friction area actually available in the synchronization process is doubled in this way.

However, double-cone rings produced in this manner have the serious drawback of reduced friction quality. In view of the massive carrier metal sheet required for such designs, high reshaping forces are applied to the friction lining area during the deep-drawing process. This causes the sprinkled-on and sintered friction linings to lose their original, particularly characterizing porosity and friction properties for such friction applications, with the consequence that the gain obtained in the overall driving behavior due to doubling of the area of friction is approximately reduced again to the level of the structural part with a friction area on one side and fully developed sprinkled-on and sintered friction lining quality.

SUMMARY OF THE INVENTION

Therefore, an object of the present invention is to make available for the joining of structural parts of the type specified above a process not having the drawbacks of the methods heretofore tested for such types of structural parts. In particular, the process in accordance with the present invention is intended to make it possible to make available particularly structural parts having spot welds in the friction area itself and, consequently, not having the aforementioned drawbacks of foils welded only outside of the active friction area. The structural parts so produced exhibit enhanced strength and adhesion between the foil and the basic body, so that the strength reserves generally specified in the field of automobile manufacture for safety versus failure are assured. The novel joining process should in any case only insignificantly impair the frictionally active, "bearing" part of the friction area, measured against the theoretically available friction area. For this purpose, it is necessary to limit the welding zones to areas of the foil that are already lost as a frictionally active part in the friction lining in the form of drainage grooves.

In accordance with the present invention, a process is provided for joining a structural component comprising of a metallic basic body and a sintered, friction-lined foil that is applied to the basic body by electric spot welding. The basic body includes a truncated cone-shaped surface, and the foil having a total thickness of 0.4 to 2.5 mm comprises of a ductile, metallic carrier metal sheet and a porous metal/nonmetal sintered lining. The process in accordance with present invention comprises the steps of embossing individual naps having a basic surface area of 0.5 to 4 $mm^2$ in the foil, the embossed naps being distributed over the foil; pressing the foil radially onto the truncated cone-shaped surface of the basic body above the naps to form abutting surfaces, by means of a pressure punch which also serves as an electrode, until a controlled electric residual resistance of the composite is reached; and welding the parts to be joined by means of high-current pulse discharges of $10^{-1}$ to $10^{-4}$ seconds duration, forming a melting zone within the area of the abutting surfaces of the naps. Each of the following is cumulatively applicable to the welding zone formed by the above process: (1) horizontal surface expansion by 50 to 95% of the basic nap surface area; (2) radial longitudinal expansion smaller than the mean horizontal longitudinal expansion; (3) melting zone limited to the range of the material of the basic body and the carrier metal sheet; and (4) in the radial direction, layer-like sequence of material zones having different compositions and/or structures.

The foregoing specific objects and advantages of the invention are illustrative of those that can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

DESCRIPTION OF THE PREFERRED EMBODIMENTS

The sprinkled-on and sintered friction-lined foils used according to the invention are comparable to those described in the foregoing.

While pulse welding in particular also in the form of the capacitor discharge technique is known as such, no usable experience is available for welding foil-like materials conforming to the sprinkled-on and sintered friction-lined foil with a two-layer structure which, in terms of material, is highly inhomogeneous. In fact, great importance is attributed to the development of the welding zone in terms of material and space according to the process of the invention. It has not been possible to produce even approximately comparable welded joints by any other welding method.

A measure of prime importance in connection with the process of the present invention is the adjustment of a controlled electrical residual resistance of the composite. The electrical pulse of a capacitor discharge machine is inductively fed into the welding current circuit via a transformer having the inner resistance (Ri). With low electrical voltage of, for example, 20 volts, the welding current circuit is designed for a current of up to 100,000 A. Correspondingly important is the adjustment and maintenance of an adapted electrical resistance (Ra) in the electrode (pressure punch/foil/basic body composite). (Ra) must be approximately equal to (Ri). An excessively high punch contact pressure applied to the naps (i.e., an (Ra) that is too low) will not produce the desired melting zone and will not result in any effective bearing joint. Too low a pressure applied to the punch, which means an (Ra) that is too high, also will not lead to any welded joint, but only to splashing of foil material within the range of the nap.

Maintaining a total welding energy, which preferably is to be transmitted with the pulse, is no less determining the success. The values according to the invention are in a narrow energy range depending on the materials used. In this connection, a graphical representation of the forces of shear—required for detaching or tearing off a nap or burl fused by welding with the basic body—as a function of the welding energy per burl shows a curve development with a distinctly pronounced maximum.

However, even the introduction of an optimized welding energy will not yet assure any good welding connection. The equation $E=\int I(t)^2 \times R_a(t) dt$ is applicable to the electrical energy (E). The current (I) occurring on the average during the discharge pulse leads to heating and melting of the materials within the zone of the joint. Now, if the pulse duration (t) is too long (i.e., greater than $10^{-1}$ seconds), heating does not remain limited to the desired melting range or zone, but rather results in more or less uncontrolled expansion of the melting zone both in the basic body and in the foil beyond the range or zone of the burl.

Excessively short pulse times of less than $10^{-4}$ seconds are difficult to control in terms of equipment technology, on the one hand, and lead to disadvantageous cracks and flow processes in the material.

Finally, the introduction of a suitable, spread pressure punch—which also serves as the welding electrode—is important to the test result. As stated before, a controlled residual resistance has to be adjusted in the joined composite. The contact pressure which, as a rule, is simultaneously applied to the foil within the entire zone of the cone, has to be distributed to all burls or naps as uniformly as possible.

Therefore, for the purpose of compensating punch pressure asymmetries, which are unavoidable in practical application, a first current pulse is advantageously applied, the spread punch is turned, for example by 180°, and a second current pulse is then applied for after-welding. It is indispensable in connection with the process that the pressure punch resting under contact pressure on the foil have such a force of pre-tension that the punch, if radial shrinkage of the foil and/or basic body occurs during the welding process, be made to follow up practically without delay, so that the punch pressure and thus the outer resistance (Ra) of the welding current circuit remain largely unchanged across the entire duration of the pulse.

The process in accordance with the present invention is not intended to be restricted to certain parts, structural shapes and basic materials. However, the process is preferably used in connection with structural components employed as synchronizing devices in oil-lubricated motor vehicle gearboxes. Joints in the frictional surfaces of synchromesh rings, or alternatively also within the zone of the conical speed-gear surface of a friction pair are conceivable in the same way. The friction surfaces may be designed as inside cone and/or outside cone surfaces.

It is particularly possible by the process according to the invention to expand the manufacture of double-cone rings having sprinkled-on and sintered friction linings by an entirely novel and enhanced technology with significant property improvements as compared to rings according to the known state of the art.

Structural components for the "synchronizing system" application sector are nowadays increasingly produced in the form of molded and sintered parts because of their complex geometric shape, and no longer as heretofore by machining melt blanks. However, sintered components, when finished, still have a residual porosity, which generally makes it more difficult to join such parts, and only permits welded joints with comparatively limited strength and adhesion. The process according to the invention is applicable with special advantage to sintered basic bodies, because the originally porous structure of the sintered body is noticeably densified and, therefore substantially strengthened within the zone of the joint by the high, shock-like current pulse.

Other preferred developments of the process of the invention and structural components produced by such process are described in the sub-claims of the patent.

Application of the process according to the invention to structural parts of the type described herein has not been suggested by any of the prior art. The special formation of the individual welding zones, which in turn is obtained only by maintaining individual boundary conditions of the process that are important to the invention, came as a surprise.

Owing to the short-time, shock-like welding process according to the invention, the following is achieved:

Sticking of the pressure punch die to the foil is avoided (as opposed to the welding process with conventional automatic welding equipment, where, for example, folding tongs are used with a thin punch);

the sintered basic body is dynamically compressed and the mechanical strength is consequently increased within the zone of the welded joint;

the material exchange characteristically occurring in welding takes place, particularly the migration of free carbon predominantly in the radial direction, as tests of the material structure clearly show; and only little heat is generated in the basic body and in the foil outside of the welding zone, or, in many cases, only a minor increase in the temperature occurs, so that the sprinkled-on and sintered friction lining does not melt during the welding process even within the zone of the naps, and the "bearing" friction surface—which is the area outside of the naps or drainage grooves—is not impaired.

In addition to the qualitative improvements in the strength of structural components according to the invention, parts manufactured according to the present invention offer a number of additional advantages over the prior art:

While sprinkled-on and sintered friction-lined foils in synchronizing systems according to the state of the art can be calibrated to the nominal size only to a limited extent after they have been incorporated, and accordingly require as a precondition high dimensional accuracy of the unlined conical surfaces in the basic body, if need be via mechanical reworking of the prefabricated structural component, calibration of the finished, welded component to the nominal size of the surface of the cone can be carried out without any problem in connection with components produced according to the process of the invention.

The burled or napped foil can be welded to gas- or plasma-nitrated and to application-hardened material surfaces of the basic body.

The production cycles for applying the foil to the basic body are significantly shorter particularly with large component dimensions than those for laser-welded components manufactured according to the practiced state of the art. This makes the manufacture more economical.

Structural parts produced according to the process of the invention have welded joints that are largely free of cracks and pores, as opposed to laser-welded structural parts solely used heretofore in practice.

EXAMPLE 1

By implementing the joining process according to the invention, a napped or burled sprinkled-on and sintered friction-lined foil is incorporated in the inner or outer cone of a synchronizing ring produced powder-metallurgically with a ring diameter of 114 mm, or of a corresponding synchromesh cone as the basic body of the structural part, and resistance-welded by means of high-current pulses. The sprinkled-on and sintered friction-lined foil comprises a ductile, flexible carrier metal sheet based on iron (grade ST 2), and a sprinkled-on and sintered friction lining applied thereto by sintering, the lining substantially comprising bronze, brass, copper, tin, zinc, quartz, graphite and/or sintered steel particles. The sprinkled-on, sintered friction lining is provided with a honeycomb pattern of oil drainage grooves.

The sintered, friction-lined foils, which, according to standardized processes, are exclusively produced in the form of plane foils, are first uniformly embossed from the coating side with notches (naps) with the help of a hydraulic press, such naps being uniformly distributed across the surface or area in the form of points. The naps are embossed within the surface zone of the oil drainage grooves, to wit, simultaneously with the grooves and with one single embossing punch die. This reduces the frictionally active part of the surface of the foil only minimally. The naps are generally semispherically shaped and have a base surface area of 1.3 mm$^2$ and a height of 0.25 mm.

The naps have to be uniformly distributed across the foil so that the other areas of the carrier metal sheet will not come into contact with the basic body when the foil is placed on the metal sheet and welded to it. Otherwise, undesirable short-circuits would be caused in the welding process, and the desired fusing, limited to the napped areas, would not take place. The foil has a total thickness of 1 mm. The carrier metal sheet and the sintered friction-lined foil each have a thickness of 0.5 mm. After the foil or, if need be, 2 or 3 sections of foil have been folded and placed on the truncated cone-shaped friction surface of the basic body, the foil is pressed onto the basic body with the help of a segmented pressure punch die, namely with up to a pressure value sufficient to reach a predetermined electrical residual resistance in the composite so formed. The naps are partly deformed in this process (i.e., the center of the originally semispherically shaped nap is slightly flattened). The pressure punch die has spreading elements which, for example during compressing or shrinking of the areas so coated in the course of the welding process, permit the punch die to reset radially with practically no time lag at a contact pressure that remains practically unchanged.

In the subsequent capacitor discharge welding process, all naps are simultaneously fused with the basic material by two successive current pulses. By introducing a second pulse immediately after the first one, a tempering effect is achieved in the hardening zone within the welding area, and thereby ductilization of layers that were previously brittle-hardened. In addition, it is possible to compensate with a second pulse asymmetries within individual areas of the foil that cannot be avoided completely in terms of the punch contact pressure and shaping of the welding zone within the individual nap. The energy introduced per nap in this process comes to a value of approximately 0.1 kWs. The welding time came to $5 \times 10^{-3}$ s; the welding current reached a peak value of about 50,000 amperes, or about 1000 A per nap.

The welding zones subsequently formed in the areas of the naps were within the range claimed according to the invention in terms of the melting zone and structure of the material. The original depth of the naps of 0.25 mm was reduced by the welding process to about 0.1 mm; the horizontal expanse of the area of the welding zone came to about 90% of the basic surface area of the naps. The described welding parameters were determined in a series of preceding optimization tests carried out with means familiar to a person of ordinary skill in the art.

A structural component produced according to the process in the form of a synchromesh ring was first subjected to a mechanical strength test. In such a test, the foil is tested for its strength against tearing from the basic body by means of forces of shear attacking it laterally on the narrow side, or the force of shear required to force the foil out of the conical surface is determined.

For pressing out the foil, the structural part produced according to the invention required a shear force of 0.5 kN/nap. As compared to the usual friction grip, only less than 1/10th of the value can be applied to the synchromesh structural component with the usual nap density by pressing of the frictional area of the lining.

The foil can be removed by pressure from the surface of the cone only by tearing it along the boundary of its welding zone. Neither lifting of the foil from within the napped zone nor tearing of the foil into the interior of the welding zone occurs.

In addition, dynamic load change tests were carried out. In these tests, the load was changed 1 million times, under shear forces of about 0.25 kN/nap, which maximally occur in practical life on the frictional surface of the cone under dynamic load, which is four times the amount of load change expected for mass-produced transmissions, without resulting in any visible formation of cracks in the welding zone or even tearing of the foil.

Subsequently, the synchromesh ring was tested for its useful life on a test stand that reproduces the processes occurring when shifting a motor vehicle gearbox under conditions close to those found in practical application. The synchromesh ring was tested under the following conditions:

| | |
|---|---|
| Surface pressure applied | 4.5–5.3 N/mm$^2$ |
| Specific type of friction | 0.47 Joule/mm$^2$ |
| Sliding speed | 8 m/s |
| Oil used | ATF |

Surface pressure of 5 N/mm$^2$ corresponds to the highest values occurring in practical transmission application. The test was discontinued after more than 200,000 gear shifts without any notable wear visible on the synchromesh ring.

Another synchromesh ring with a cone diameter of 114 mm, produced according to the present example, was used in another simulator test with a surface pressure of 4.5 to 5.3 N/mm$^2$, and tested in a graduated test, in which a total of 125,000 gear shifts were carried out at sliding speeds alternating between 8 and 9.6 m/s, and with step-by-step increase of the specific friction work from initially 0.35 via 0.47 to 0.65 Joule/mm$^2$. This test, too, was discontinued without noticeable phenomena of failure. In this test, the area pressure of 5 N/mm² matched a frictional torque per welding spot of 2 Nm=0.035 kN shear force/nap.

Subsequent testing of the structure showed that the welded nap joints survived this test without any damage. These values of wear and useful life are not exceeded by any known structural component produced by another process, and by far exceed the load limit value to which corresponding structural components are usually subjected to in transmissions.

EXAMPLE 2

Applying the process according to Example 1, two napped, unilaterally sintered foils were welded to each other with the help of capacitor discharge welding in such a way that a double-cone ring is produced for synchronizing systems in motor vehicle gearboxes.

In this process, two napped sintered, friction-lined foils, which were first produced in the form of flat foils and subsequently cut to the required surface area, were bent with the help of rolls, preferably 1 rubber roll (on the side of the friction lining) and 1 steel roll, in such a way that the curvature of the side of the friction lining of the one foil pointed outwardly, and the one of the other foil inwardly. Only one foil shall be napped and the other remains unnapped. The foils are applied to a correspondingly shaped cone surface with their joints displaced against one another by 180°, exposed to pressure by means of segmented copper punch from the opposite direction, and welded by means of pulsed current discharges.

As an alternative, the two foils are welded not directly against each other, but to a dimensionally stable carrier metal sheet (smooth steel sheet without sintered friction coating) placed between the two foils. Unless the foil is already provided with stop cams prior to welding in accordance with the later operating requirements, such cams are cut out or milled out after the welding step by means of laser. As opposed to the deep-drawn double-cone according to the prior art, no compression of the surface of the sintered, friction lining takes place in this production process.

Due to the manner in which the individual foils are fixed according to the present invention, the double-cone joined according to this process has adequate stiffness, but yet has sufficient elasticity for adapting itself to the surfaces of the synchronizing friction pairing (i.e., to the outer cone of the inner ring and the inner cone of the outer ring) in a better way than double-cone rings according to the prior art. The frictional connection and the transmittable frictional torque resulting therefrom permit high shifting efficiency combined with exceptional shifting comfort.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

I claim:

1. A process for joining a structural component comprising a metallic basic body and a sintered, friction-lined foil, the basic body having a truncated cone-shaped surface, the foil having a total thickness of 0.4 to 2.5 mm, and the foil comprising of a ductile, metallic carrier sheet and a porous metal/non-metal sintered lining, the process comprising the steps of:

embossing individual naps having a basic surface area of 0.5 to 4 mm² in the foil, the embossed naps being distributed over the foil;

pressing the foil radially onto the truncated cone-shaped surface of the basic body above the naps to form abutting surfaces, by means of a pressure punch which also serves as an electrode, until a controlled electric residual resistance of the composite is reached; and electric spot welding the foil to the basic body by means of high-current pulse discharges of $10^{-1}$ to $10^{-4}$ seconds duration, forming a melting zone within the area of the abutting surfaces of the naps, wherein the melting zone so formed has the following characteristics:

horizontal surface expansion by 50 to 95% of the basic nap surface area, radial longitudinal expansion smaller than the mean horizontal longitudinal expansion, melting zone limited to the range of the material of the basic body and the carrier metal sheet, and in the radial direction, layer-like sequence of material zones having different compositions and/or structures.

2. The process for joining a structural component according to claim 1, wherein the high-current pulse discharge has a duration of $5\times10^{-2}$ to $5\times10^{-3}$ seconds.

3. The process for joining a structural component according to claim 1, wherein a horizontal surface expansion of the welding zone of 85 to 90% of the basic surface area of the naps is produced.

4. The process for joining a structural part according to claim 1, further comprising the step of generating a pulse having a current intensity of at least 500 amperes per nap.

5. The process for joining a structural component according to claim 1, further comprising the steps of generating two successive high-current pulse discharges, one immediately following the other.

6. The process for joining a structural component according to claim 5, wherein the high-current pulse discharge is generated by means of a capacitor discharge and inductively transformed in a low-voltage welding current circuit.

7. The process for joining a structural component according to claim 6, wherein the controlled electric residual resistance of the composite is approximated to the inner resistance of the welding current circuit.

8. The process for joining a structural component according to claim 1, wherein the basic body is a molded and sintered part.

9. The process for joining a structural component according to claim 1, further comprising the step of compressing and mechanically stiffening porous material components within the area around the melting zone.

10. The process for joining a structural component according to claim 1, wherein the basic body is made from a carbon-containing iron material, and further comprising the step of producing a martensite intermediate-stage in a first layer and a perlite intermediate-stage structure in a second layer of the melting zone.

11. The process for joining a structural component according to claim 1, wherein a segmented spreading punch is used as the pressure punch, which, under high spreading pressure, is capable of follow-up in the direction of contact pressure free of time-lag.

12. The process for joining a structural component according to claim 1, further comprising the step of forming drainage grooves in the foil during the embossing step, wherein the nap areas are supermounted by drainage grooves, the embossed naps having a depth of 0.2 to 1 mm.

13. The process for joining a structural component according to claim 1, further comprising the step of applying a sintered, friction-lined foil to both sides of a truncated cone-shaped, dimensionally stable metal sheet as the basic body.

14. A structural component produced according to the process of claim 1, wherein the component is a synchronizing part for a motor vehicle gearbox.

15. A structural component produced according to the process of claim 1, wherein the component is a double-cone synchronizing ring with two sintered, friction-lined foils welded to each other, wherein the unlined areas of carrier metal sheets flatly rest against one another spaced at the depth of one nap and the joints are displaced against each other by 180 degrees.

\* \* \* \* \*